United States Patent
Jung et al.

(10) Patent No.: US 9,674,794 B2
(45) Date of Patent: *Jun. 6, 2017

(54) APPARATUS AND METHOD OF PERFORMING SYNCHRONIZING IN A WIRELESS ACCESS SYSTEM SUPPORTING A PLURALITY OF ZONES FOR COMMUNICATION BETWEEN MOBILE STATION AND BASE STATION

(71) Applicant: LG ELECTRONICS INC., Seoul (KR)

(72) Inventors: Inuk Jung, Anyang-si (KR); Jinsam Kwak, Anyang-si (KR); Kiseon Ryu, Anyang-si (KR); Wookbong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,101

(22) Filed: May 4, 2016

(65) Prior Publication Data

US 2016/0249304 A1    Aug. 25, 2016

Related U.S. Application Data

(63) Continuation of application No. 14/569,503, filed on Dec. 12, 2014, now Pat. No. 9,369,972, which is a
(Continued)

(30) Foreign Application Priority Data

Apr. 7, 2011    (KR) .................... 10-2011-0032175

(51) Int. Cl.
  *H04W 36/00*    (2009.01)
  *H04B 7/00*    (2006.01)
(Continued)

(52) U.S. Cl.
  CPC ......... *H04W 52/283* (2013.01); *H04L 5/0007* (2013.01); *H04W 36/0072* (2013.01);
(Continued)

(58) Field of Classification Search
  CPC ... H04W 52/146; H04W 52/34; H04W 24/02; H04W 52/367; H04W 72/0413;
(Continued)

(56) References Cited

U.S. PATENT DOCUMENTS 7,725,584 B1 * 5/2010 Hanmann ........... H04L 67/1095
                                                                370/350
2006/0079235 A1    4/2006 Kim
(Continued)

FOREIGN PATENT DOCUMENTS

CN        101453771        6/2009
JP        2009-105979      5/2009
(Continued)

OTHER PUBLICATIONS

The State Intellectual Property Office of the People's Republic of China Application Serial No. 201180062862.1, Office Action dated Aug. 4, 2015, 7 pages.
(Continued)

*Primary Examiner* — Christopher M Brandt
(74) *Attorney, Agent, or Firm* — Lee Hong Degerman Kang Waimey (57) ABSTRACT

The present invention relates to a broadband wireless access system, and more particularly, to a method for efficiently determining power for ranging performed by a terminal on a target base station or a target region during handover or during changing of a region. A method for controlling uplink power for network reentry of a terminal from a first region to a second region in a broadband wireless access system, according to an embodiment of the present invention, com-
(Continued)

prises the steps of: receiving a media access control (MAC) management message including a power control parameter that is to be applied to the second region from the first region; and performing ranging to the second region by applying the power control parameter.

16 Claims, 6 Drawing Sheets

Related U.S. Application Data continuation of application No. 13/883,245, filed as application No. PCT/KR2011/008326 on Nov. 3, 2011, now Pat. No. 9,026,116.

(60) Provisional application No. 61/409,937, filed on Nov. 3, 2010.

(51) Int. Cl.
| | | |
|---|---|---|
| *H04W 4/00* | (2009.01) | |
| *H04B 7/185* | (2006.01) | |
| *H04W 52/28* | (2009.01) | |
| *H04W 52/38* | (2009.01) | |
| *H04W 52/14* | (2009.01) | |
| *H04W 52/40* | (2009.01) | |
| *H04W 56/00* | (2009.01) | |
| *H04L 5/00* | (2006.01) | |
| *H04W 72/04* | (2009.01) | |

(52) U.S. Cl.
CPC ......... *H04W 52/146* (2013.01); *H04W 52/38* (2013.01); *H04W 52/40* (2013.01); *H04W 56/00* (2013.01); *H04W 56/001* (2013.01); *H04W 72/048* (2013.01); *Y02B 60/50* (2013.01)

(58) Field of Classification Search
CPC . H04W 72/04; H04W 28/18; H04W 72/1278; H04W 72/52; H04W 72/325; H04W 52/04; H04W 72/1242; H04W 72/1268; H04W 52/0235; H04W 36/0061; H04W 36/06; H04W 36/08; H04W 36/14
USPC .......................... 455/436, 522; 370/331, 318
See application file for complete search history.

(56) References Cited

U.S. PATENT DOCUMENTS

| | | |
|---|---|---|
| 2008/0305804 A1 | 12/2008 | Lee et al. |
| 2009/0103465 A1 | 4/2009 | Chow et al. |
| 2009/0109923 A1 | 4/2009 | Kojima |
| 2009/0168750 A1 | 7/2009 | Pelletier et al. |
| 2010/0002653 A1 | 1/2010 | Agiwal et al. |
| 2010/0040043 A1 | 2/2010 | Li et al. |
| 2010/0069073 A1 | 3/2010 | Chen et al. |
| 2010/0085941 A1 | 4/2010 | Chin et al. |
| 2010/0098025 A1 | 4/2010 | Chen et al. |
| 2010/0260142 A1 | 10/2010 | Jung et al. |
| 2011/0044287 A1 | 2/2011 | Park et al. |
| 2011/0107087 A1 | 5/2011 | Lee et al. |
| 2011/0110329 A1 | 5/2011 | Yang et al. |
| 2011/0159913 A1 | 6/2011 | Yang et al. |
| 2011/0199945 A1 | 8/2011 | Chang et al. |
| 2012/0087337 A1 | 4/2012 | Yang et al. |
| 2012/0093102 A1 | 4/2012 | Zhang et al. |

FOREIGN PATENT DOCUMENTS

| | | | |
|---|---|---|---|
| JP | 2009-284317 | 12/2009 | |
| KR | 10-2006-0032466 | 4/2006 | |
| KR | 10-2010-0002573 | 1/2010 | |
| KR | 1020100081909 | 7/2010 | |
| KR | 10-2010-0090540 | 8/2010 | |
| KR | 10-2010-0097624 | 9/2010 | |
| WO | 2009/023228 | 2/2009 | |
| WO | 2009/107910 | 9/2009 | |
| WO | 2010/002169 | 1/2010 | |
| WO | 2010/045877 | 4/2010 | |
| WO | WO 2010/093301 A1 * | 8/2010 | ............... H04L 5/00 |
| WO | WO 2012/037704 A1 * | 3/2012 | ............ H04W 56/00 |

OTHER PUBLICATIONS

PCT International Application No. PCT/KR2011/008326, Written Opinion of the International Searching Authority dated Jul. 31, 2012, 17 pages.
Wozniak, et al., "Wireless and Mobile Networking," Second IFIP WG 6.8 Joint Conference, WMNC 2009, Sep. 2009, pp. 324-326.
U.S. Appl. No. 13/883,245, Notice of Allowance dated Jan. 21, 2015, 10 pages.
Feng, et al., "Proposed Text for the IEEE P802.16m/D2: AMS ID Privacy", IEEE C80216m-09_2322r5, Nov. 6, 2009, 12 pages.

* cited by examiner

APPARATUS AND METHOD OF PERFORMING SYNCHRONIZING IN A WIRELESS ACCESS SYSTEM SUPPORTING A PLURALITY OF ZONES FOR COMMUNICATION BETWEEN MOBILE STATION AND BASE STATION

CROSS-REFERENCE TO RELATED APPLICATIONS

This application is a continuation of U.S. patent application Ser. No. 14/569,503, filed on Dec. 12, 2014, now U.S. Pat. No. 9,369,972, which is a continuation of U.S. patent application Ser. No. 13/883,245, filed on Jul. 9, 2013, now U.S. Pat. No. 9,026,116, which is the National Stage filing under 35 U.S.C. 371 of International Application No. PCT/KR2011/008326, filed on Nov. 3, 2011, which claims the benefit of earlier filing date and right of priority to Korean Application No. 10-2011-0032175, filed on Apr. 7, 2011, and also claims the benefit of U.S. Provisional Application No. 61/409,937, filed on Nov. 3, 2010, the contents of which are all hereby incorporated by reference herein in their entirety.

TECHNICAL FIELD

The present invention relates to a broadband wireless access system and, more particularly, to a method of efficiently deciding power of ranging performed by a mobile station to a target base station or a target zone during handover or zone switch.

BACKGROUND ART

Handover (HO) means that a mobile station moves from a wireless interface of a base station to a wireless interface of another base station. Hereinafter, a handover procedure in a general Institute of Electrical and Electronics Engineers (IEEE) 802.16 system will be described.

In an IEEE 802.16 network, a serving base station (SBS) may broadcast neighbor base station information through a neighbor advertisement (MOB_NBR-ADV) message to inform a mobile station (MS) of information (topology) about a fundamental network configuration.

The MOB_NBR-ADV message contains system information, such as a preamble index, frequency, a degree of handover (HO) optimization, downlink channel descriptor (DCD)/uplink channel descriptor (UCD) information, regarding the serving base station and neighbor base stations.

The DCD/UCD information includes information that the mobile station should know in order to transmit and receive information through a downlink and an uplink. For example, the DCD/UCD information includes handover (HO) trigger information, a Medium Access Control (MAC) version of a base station, Media Independent Handover (MIH) capability, etc.

A general MOB_NBR-ADV message contains only information regarding IEEE 802.16e type neighbor base stations. As a result, information regarding other type neighbor base stations excluding the IEEE 802.16e type neighbor base stations may be broadcast to mobile stations through a Service Identity Information ADVertisement (SII-ADV) message. Consequently, the mobile station may request the serving base station to transmit the SII-ADV message to acquire information regarding this type network base station.

A process of a mobile station which acquires information of neighbor base stations through the aforementioned method performing handover in an IEEE 802.16 network will hereinafter be described in more detail with reference to FIG. 1.

Figure 1:
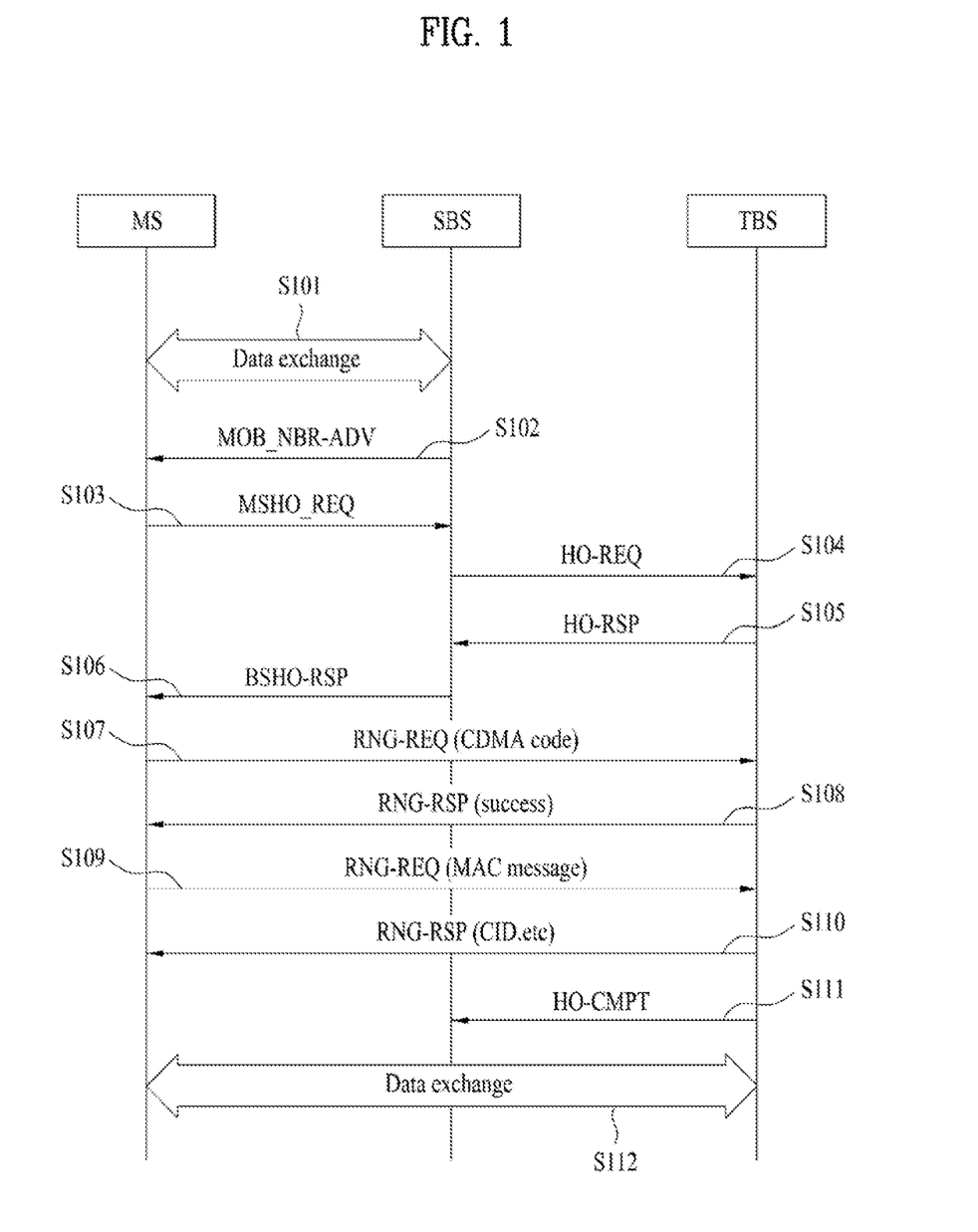
FIG. 1 is a view showing an example of a handover procedure which may be performed in an Institute of Electrical and Electronics Engineers (IEEE) 802.16e system.

FIG. 1 is a view showing an example of a handover procedure which may be performed in a general IEEE 802.16 system.

Referring to FIG. 1, a mobile station (MS) may be accessed to a serving base station (SBS) to exchange data with the serving base station (S101).

The serving base station may periodically broadcast information regarding a neighbor base station in which the serving base station is located to the mobile station through a MOB_NBR-ADV message (S102).

The mobile station may start to scan candidate handover base stations (HO BSs) using a handover (HO) trigger condition while communicating with the serving base station. The mobile station may transmit a handover request (MOB_MSHO-REQ) message to request the serving base station to perform a handover procedure when a handover condition is satisfied, for example, when a predetermined hysteresis margin value is exceeded (S103).

The serving base station may inform the candidate handover base stations (HO BSs) contained in the MOB_M-SHO-REQ message of handover request from the mobile station through an HO-REQ message (S104).

The candidate handover base stations (HO BSs) may perform pre-processing for the mobile station that requests the handover and transmit information regarding the handover to the serving base station through an HO-RSP message (S105).

The serving base station may transmit the information regarding the handover, acquired through the HO-RSP message, from the candidate handover base stations to the mobile station through a handover response (MOB_BSHO-RSP) message. The MOB_BSHO-RSP message may contain information required to perform the handover, such as action time, a handover identifier (HO-ID), and a dedicated handover code division multiple access (CDMA) ranging code (Dedicated HO CDMA ranging code) (S106).

The mobile station may determine one target base station from among the candidate handover base stations based on the information contained in the MOB_BSHO-RSP message received from the serving base station. As a result, the mobile station may try to perform ranging by transmitting a CDMA code to the determined target base station (S107).

Upon reception of the CDMA code, the target base station may transmit information representing whether or not ranging has been successfully performed and physical correction values to the mobile station through a ranging response (RNG-RSP) message (S108).

Subsequently, the mobile station may transmit a ranging request (RNG-REQ) message for authentication to the target base station (S109).

Upon reception of the ranging request message from the mobile station, the target base station may provide system information, such as a Connection Identifier (CID), which may be used in the corresponding base station to the mobile station through the ranging response message (S110).

When the target base station has successfully performed authentication of the mobile station and transmitted all update information, the target base station may inform the serving base station of the mobile station whether or not the handover has been successfully performed through a handover completion (HO-CMPT) message (S111).

Subsequently, the mobile station may exchange information with the target base station to which the handover has been performed (S112).

It is assumed that the above-described handover process is performed between a mobile station and a base station conforming to an IEEE 802.16e system (WirelessMAN-OFDMA R1 Reference System). In a handover procedure defined in an IEEE 802.16m (WirelessMAN-Advanced Air Interface) system, kinds of some medium access control (MAC) management messages and parameters contained in the MAC management messages may be different from each other. For example, ranging request/response (RNG-REQ/RSP) messages may be replaced with advanced ranging request/response (AAI-RNG-REQ/RSP) messages and a handover response (BSHO-RSP) message may be replaced with a handover command (AAI-HO-CMD) message.

When a mobile station initially and directly transmits an uplink signal to a target base station (for example, when the mobile station transmits the ranging code as in step S107) during an handover process, the uplink signal is transmitted using default power predefined by a system since the optimum transmit power is not recognized. If the power is too low, the signal may not be correctly transmitted. On the other hand, if the power is too high, the signal may interfere with a signal transmitted by another mobile station or a battery of the mobile station may be consumed. For this reason, optimum uplink power control is very important. In the IEEE 802.16m system, the base station transmits a ranging acknowledgement (AAI_RNG-ACK) message to the mobile station as a response to the ranging code transmitted from the mobile station. The mobile station may determine whether or not the ranging code has been detected and recognize information, such as physical correction values, and determine whether it is necessary to retransmit the ranging code through the ranging acknowledgement message. In a case in which the default power is not suitable for a channel environment between the current mobile station and the base station, a ranging status field of the ranging acknowledgement message is set to "continue" and a power correction value is contained in the corresponding message. In this case, the mobile station retransmits the ranging code to the target base station using transmit power, to which the correction value has been applied. During this process, however, unnecessary delay time is generated. For this reason, an effective uplink power determination method to solve the above problem is required. The problem related to power control may be similarly generated even in a case in which the mobile station performs zone switch in a base station operating in a mixed mode.

DISCLOSURE

Technical Problem

The present invention has been made in view of the above problems, and an object of the present invention is to provide an effective uplink power determination method.

Another object of the present invention is to provide a method of efficiently determining uplink transmit power when performing ranging to a target base station during handover or when performing ranging to a target zone during zone switch.

The technical problems solved by the present invention are not limited to the above technical problems and those skilled in the art may understand other technical problems from the following description.

Technical Solution

In accordance with an aspect of the present invention, the above objects may be accomplished by the provision of a method of a mobile station performing uplink power control for network reentry from a first zone to a second zone in a broadband wireless access system, the power control method including receiving a medium access control management (MAC management) message containing a power control parameter to be applied to the second zone from the first zone and applying the power control parameter to perform ranging to the second zone.

The first zone may be a serving base station (S-ABS) and the second zone may be a target base station (S-ABS). In addition, the medium access control management message may be a handover command (AAI-HO-CMD) message.

The handover command message may further contain a dedicated ranging code and the step of performing the ranging may include transmitting the dedicated ranging code to the target base station.

The first zone may be a legacy zone (LZone) of a base station operating in a mixed mode and the second zone may be a mobile station support zone (MZone) of the base station. In addition, the medium access control management message may be a ranging response (RNG-RSP) message.

The ranging response message may further contain a temporary station identifier (TSTID) for the MZone to temporarily identify the mobile station, the step of performing the ranging may include transmitting bandwidth request (BR) information to request an uplink resource to transmit a ranging request message to the MZone, and the power control parameter may be applied to the bandwidth request (BR) information.

In accordance with another aspect of the present invention, the above objects may be accomplished by the provision of a method of a serving base station supporting handover in consideration of uplink power control performed by a mobile station in a broadband wireless access system, the handover support method including receiving a dedicated ranging code and power control information from a target base station and transmitting a handover command (AAI-HO-CMD) message containing the dedicated ranging code and a power control parameter to be applied to the target base station to the mobile station.

In accordance with another aspect of the present invention, the above objects may be accomplished by the provision of a method of a base station operating in a mixed mode supporting zone switch in consideration of uplink power control performed by a mobile station in a broadband wireless access system, the zone switch support method including transmitting a ranging response message containing a temporary identifier to identify the mobile station at a second zone through a first zone and a power control parameter to be applied to the second zone to the mobile station and receiving a bandwidth request information containing the temporary identifier through the second zone.

In accordance with a further aspect of the present invention, the above objects may be accomplished by the provision of an advanced mobile station (AMS) performing uplink power control for network reentry from a first zone to a second zone of a broadband wireless access system, the advanced mobile station including a processor and a radio frequency (RF) communication module to transmit and receive to and from an external device under control of the processor, wherein, upon receiving an MAC management message containing a power control parameter to be applied to the second zone from the first zone, the processor controls the received power control parameter to be applied to perform ranging to the second zone.

The first zone may be a serving base station (S-ABS) and the second zone may be a target base station (S-ABS). In addition, the medium access control management message may be a handover command (AAI-HO-CMD) message.

The handover command message may further contain a dedicated ranging code and the processor may control the dedicated ranging code to be transmitted to the target base station in a state in which the power control parameter is applied to the dedicated ranging code.

The first zone may be an LZone of a base station operating in a mixed mode and the second zone may be an MZone of the base station. In addition, the medium access control management message may be a ranging response (RNG-RSP) message.

The ranging response message may further contain a temporary station identifier (TSTID) for the MZone to temporarily identify the mobile station and the processor may control bandwidth request (BR) information to request an uplink resource to transmit a ranging request message to be transmitted to the MZone in a state in which the power control parameter is applied to the bandwidth request (BR) information.

In the above embodiments, the power control parameter may include an Interference over Thermal value of Frequency Partition (iotFP) and an offsetControl value.

Advantageous Effects

Embodiments of the present invention have the following effects.

First, it is possible for a mobile station to efficiently determine transmit power of a ranging code during handover using the embodiments of the present invention.

Second, it is possible for the mobile station to efficiently determine transmit power for bandwidth request to a target zone during zone switch through the embodiments of the present invention.

The effects of the present invention are not limited to the above-described effects and other effects which are not described herein will become apparent to those skilled in the art from the following description.

BEST MODE

Embodiments described hereinafter are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station and a mobile station. The base station is a terminal node of a network, which communicates directly with a mobile station. According to circumstances, a specific operation described as performed by the base station may be performed by an upper node of the base station.

Namely, it is apparent that, in a network comprised of a plurality of network nodes including a base station, various operations performed for communication with a mobile station may be performed by the base station or network nodes other than the base station. The term 'base station (BS)' may be replaced with the term 'fixed station', 'Node B', 'evolved Node B (eNode B or eNB)', 'Access Point (AP)', etc. The term 'mobile station (or terminal)' may be replaced with the term 'user equipment (UE)', 'mobile Station (MS)', 'Mobile Subscriber Station (MSS)', 'Subscriber Station (SS)', etc.

More specifically, in this specification, the term of "legacy system" or "R1 system" is given to a system to which a general technology, including an Institute of Electrical and Electronics Engineers (IEEE) 802.16e standard, is applied for the sake of convenience. In addition, the term of "legacy mobile station" or "R1 MS" is given to a mobile station to which a legacy technology is applied and the term of "legacy base station" or "R1 BS" is given to a base station to which a legacy technology is applied. Furthermore, the term of "legacy mode" is given to an operation mode of a mobile station or a base station to which the general technology is applied.

In addition, the term of "Advanced MS (AMS)" or "advanced mobile station" is given to a mobile station to which a technology, including an IEEE 802.16m standard (WirelessMAN-OFDMA Advanced Air Interface), further advanced than the general technology is applied. The term of "Advanced BS (ABS)" or "advanced base station" is given to a base station to which the advanced technology is applied. Furthermore, the term of "advanced mode" is given to an operation mode of a mobile station or a base station to which the advanced technology is applied.

The advanced base station may also include an ABS (WirelessMAN-OFDMA R1 Reference System/WirelessMAN-OFDMA Advanced co-existing System) which supports both an AMS and a YMS. The term of "mixed mode base station" is given to the ABS which supports both the AMS and the YMS, i.e. both a legacy mode and an advanced mode, and the term of "mixed mode" is given to an operation mode of such a base station.

It is assumed that an R1 BS has only a legacy zone (LZone) having a physical channel frame structure applied to a legacy system and an ABS has only an advanced mobile station support zone (MZone: 16M Zone) having a physical channel frame structure applied to an advanced system in a case in which the ABS supports only an AMS (WirelessMAN-OFDMA advanced system only). In addition, it is assumed that an ABS (WirelessMAN-OFDMA R1 Reference System/WirelessMAN-OFDMA Advanced co-existing System: legacy supportive) which supports both an AMS and an R1 MS has both a legacy zone and an advanced mobile station support zone and that the ABS is divided (TDD: Time Division Duplex) per time, for example per frame or subframe, on uplink and downlink Additionally, it is assumed that the AMS may be served from both the AMS and the R1 MS. That is, it is assumed that the AMS may be served from the advanced mobile station support zone or the legacy zone and perform both a handover execution process defined in the legacy system and a handover execution process defined in the advanced system.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention may be supported by standard documents disclosed for at least one selected from among wireless access systems, such as an IEEE 802 system, a $3^{rd}$ Generation Partnership Project (3GPP) system, a 3GPP Long Term Evolution (3GPP LTE) system, an LTE-Advanced (LTE-A) system, and a 3GPP2 system. That is, steps or parts that are not described to clarify the technical features of the present invention may be supported by those documents. Furthermore, all terms as set forth herein may be explained by the standard documents. In particular, the embodiments of the present invention may be supported by at least one selected from among standard documents, such as P802.16-2005, P802.16e-2009, P802.16Rev2, and P802.16m documents, for an IEEE 802.16 system.

Specific terms used for the embodiments of the present invention are provided to aid in understanding of the present invention. These specific terms may be replaced with other terms within the scope and spirit of the present invention.

General Uplink Transmit Power Control Procedure

Hereinafter, an uplink power control (ULPC) procedure in an IEEE 802.16m system will be described.

The uplink power control is to control an inter-cell interference level. To this end, the uplink power control supports initial calibration and periodic adjustment to prevent data loss. In addition, an uplink power algorithm compensates for path loss, shadowing, and fast fading to determine transmit power of an Orthogonal Frequency Division Multiplexing (OFDM) symbol.

It is necessary for a mobile station serving as a transmit end to maintain transmitted power density until the transmitted power density reaches the maximum power level. That is, if the number of active logical resource units (LRUs) assigned to a user is decreased, total transmit power of the mobile station is decreased in proportion to the number of LRUs as long as a power control parameter is not further changed. On the other hand, if the number of LRUs) is increased, total transmit power of the mobile station is increased in proportion to the increased number of LRUs. However, the transmit power level does not exceed the maximum power level based on signal integrity or requirements.

The mobile station reports the possible maximum power of a carrier for initial network entry to a base station through the maximum transmit power field (MAX Tx Power field) of a mobile station basic capability request (AAI-SBC-REQ) message. For interference level control, the current interference level of each base station may be shared with the other base stations. Power per subcarrier and power per stream may be calculated by Equation 1 below.

$$P(\text{dBm}) = L + \text{SINR}_{Target} + \text{NI} + \text{Offset} \qquad \text{Equation 1}$$

In Equation 1, P indicates a transmit power level (TX power level) per stream/per carrier in the current transmission, L indicates a parameter related to path transmission loss calculated by the mobile station, and NI indicates an estimated average power level of noise and interference in the base station. In addition, offset indicates a mobile station specific power compensation value and $\text{SINR}_{Target}$ indicates a target uplink Signal to Interference plus Noise Ratio (SINR) in the base station.

Upon initial network entry/reentry, a successful initial ranging procedure is executed and then the base station transmits a code division multiple access (CDMA) allocation map information element (CDMA Allocation A-MAP IE) to the mobile station. The map information element includes a key power control parameter, such as estimated average power level (NI) of noise/interference or Offset-Control. In a case in which the mobile station successfully acquires the CDMA key power control parameter through the CDMA Allocation A-MAP IE, the parameter is applied to uplink power control. Other uplink power control parameters have default values.

Table 1 below indicates an example of default uplink power control parameters.

TABLE 1

| Type | Parameter | Default value |
| --- | --- | --- |
| Data channel control parameter | Alpha | 1/2 |
| | Beta | 0 |
| | Gamma | 0.5 |
| | dataSinrMin | 3 dB |
| | dataSinrMax | 40 dB |
| Control channel target SINR value | targetHarqSinr | 2 dB |
| | targetInitialRangingSinr | 0 dB |
| | targetSyncRangingSinr | −3 dB |
| | targetPfbchSinr | 0 dB |
| | targetSfbchBaseSinr | 1.5 dB |
| | targetSfbchDeltaSinr | 0.24 dB |
| | targetBwRequestSinr | 0.5 dB |
| Offset initialization | offsetData | 0 |

However, the power control assumes that the initial ranging procedure is successfully executed. Consequently, a method of the mobile station efficiently deciding uplink transmit power in the initial ranging procedure is required.

Hereinafter, methods of the mobile station efficiently deciding uplink transmit power according to the present invention will be described.

Power Control in a Handover Procedure

First, an uplink transmit power control method in a handover status according to the present invention will be described.

An embodiment of the present invention proposes a method of a mobile station controlling uplink transmit power for ranging execution in a handover procedure including acquiring transmit power parameters to be applied to an uplink signal to be transmitted from a serving base station to a target base station and applying the acquired transmit power parameters to transmit power control.

The transmit power parameters to be applied to the uplink signal to be transmitted to the target base station may be an Interference over Thermal value of Frequency Partition (iotFP) and offsetControl. iotFP is an Interference over Thermal value of Frequency Partition used for mobile station resource allocation and offsetControl is a power offset value set with 0.5 dB step. The transmit power parameters may be determined from information exchange between the serving base station and the target base station through a backbone network.

The transmit power parameters as described above may be transmitted to the mobile station while being contained in an handover command (AAI-HO-CMD) message in the handover process. A field (i.e. CDMA_RNG_FLAG) indicating whether the mobile station is to perform ranging using a CDMA ranging code to the target base station is present in the handover command message. If the CDMA_RNG_FLAG field is set to 0, the mobile station transmits a ranging request message to the target base station without performing the ranging using the CDMA code. On the other hand, if the CDMA_RNG_FLAG field is set to 1, the mobile station performs the ranging using the CDMA code to the target base station. Hereinafter, a handover procedure according to an embodiment of the present invention will be described based on values of the CDMA_RNG_FLAG field.

1) A case in which the CDMA_RNG_FLAG field is 0

In a case in which the CDMA_RNG_FLAG field of the AAI-HO-CMD message is set to 0, the mobile station does not perform the ranging using the CDMA ranging code to the target base station. Instead, the mobile station controls uplink transmit power according to parameters related to transmit power (for example, an offset data value and/or an offset control value) contained in the AAI-HO-CMD message. For parameters related to transmit power which are not contained in the AAI-HO-CMD message, uplink transmit power parameter values applied to the serving base station may also be applied to the target base station.

2) A case in which the CDMA_RNG_FLAG field is 1

In a case in which the CDMA_RNG_FLAG field of the AAI-HO-CMD message is set to 1, different procedures may be performed based on whether a dedicated CDMA ranging code is contained in a corresponding message.

In a case in which the dedicated CDMA ranging code is not contained, the mobile station may determine uplink transmit power through a process according to the general uplink power control procedure as described above.

On the other hand, in a case in which the dedicated CDMA ranging code is contained, the mobile station may set the iotFP value and the offsetControl value of the uplink transmit power parameters applied to dedicated ranging code transmission as values contained in the AAI-HO-CMD message. That is, in a case in which the dedicated ranging code is contained in the AAI-HO-CMD message, the base station may contain the iotFP value and the offsetControl value in a corresponding message. The other uplink transmit power control parameters except the iotFP value and the offsetControl value may be determined through a process according to the general uplink power control procedure as described above. Of course, the other uplink transmit power control parameters may also have values applied to the serving base station.

An handover process in a case in which the CDMA_RNG_FLAG field of the AAI-HO-CMD message is set to 1 and the dedicated ranging code is contained as described above will be described with reference to FIG. 2.

Figure 2:
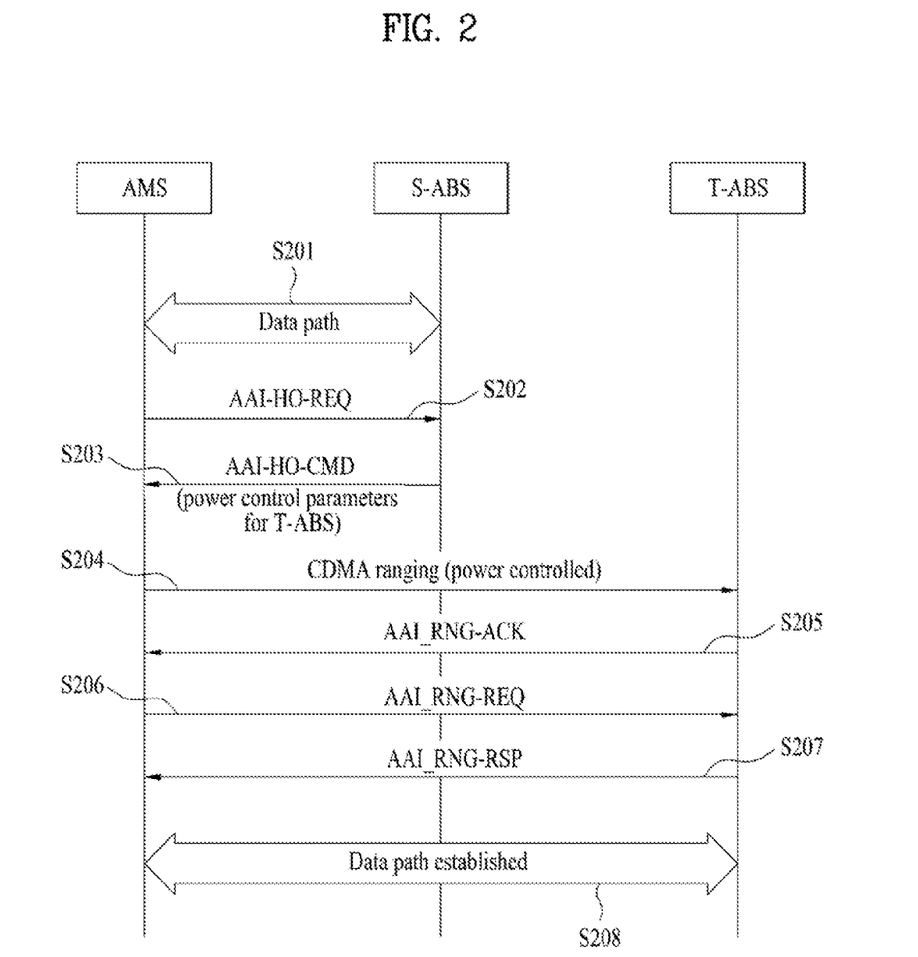
FIG. 2 is a view showing an example of a process of efficiently deciding transmit power of a ranging code transmitted from a mobile station according to an embodiment of the present invention to a target base station to perform handover.

FIG. 2 is a view showing an example of a process of efficiently deciding transmit power of a ranging code transmitted from a mobile station according to an embodiment of the present invention to a target base station to perform handover.

Referring to FIG. 2, the mobile station performs data exchange with a serving base station (S201). As a handover trigger condition is satisfied, the mobile station transmits a handover request (AAI-HO-REQ) message to the serving base station (S202).

As a result, the serving base station may exchange information with the target base station to acquire a dedicated ranging code of the target base station and determine an iotFP value and an offsetControl value to be applied to the target base station.

The serving base station transmits an handover command (AAI-HO-CMD) message containing the dedicated ranging code and the iotFP value and the offsetControl value to the mobile station (S203). At this time, a CDMA_RNG_FLAG value of the handover command message is set to 1. An example of an AAI-HO-CMD message form is indicated in Table 2 below.

Table 2 indicates an example of an AAI-HO-CMD message form, in which parameters for uplink transmit power control according to an embodiment of the present invention are contained.

TABLE 2

| Field | Size (bits) | Value/Description | Condition |
|---|---|---|---|
| }else { | | | |
| Dedicated CDMA ranging code | 5 | It indicates dedicated ranging code | In a case in which Seamless HO = 1; otherwise option |
| if (dedicated CDMA ranging code != NULL) { | | | |
| Interference over Thermal value of Frequency Partition (iotFP) | 7 | IoT value of Frequency Partition used for AMS resource assignment, quantizing IoT level from 0 dB to 63.5 dB with 0.5 dB step | |
| offsetControl | 7 | It represents value from −31.5 to 32 dB with 0.5 dB step | |
| } | | | |
| Ranging opportunity index | 3 | It represents ranging opportunity index assigned to dynamic | Option |

TABLE 2-continued

| Field | Size (bits) | Value/Description | Condition |
|---|---|---|---|
| | | ranging channel used in corresponding RAID | |

Referring to Table 2, in a case in which the dedicated CDMA ranging code is contained in the AAI-HO-CMD message, the iotFP value and the offsetControl value may also be contained in the corresponding message.

Since the CDMA_RNG_FLAG value of the handover command message is set to 1 and the dedicated ranging code is contained, the mobile station tries CDMA ranging to the target base station using the dedicated ranging code (S204). At this time, the iotFP value and the offsetControl value of the uplink transmit power control parameters applied to dedicated ranging code transmission may be values contained in the AAI-HO-CMD message.

Upon successfully receiving the dedicated ranging code transmitted from the mobile station, the base station sets a ranging status field as "success" and transmits the ranging status field to the mobile station (S205).

As a result, the mobile station may exchange a ranging request/response message with the target base station (S206 and S207) and complete a network reentry procedure into the target base station to normally perform data exchange (S208).

Uplink Power Control in a Zone Switch Procedure

Hereinafter, an uplink power control method in a zone switch procedure according to the present invention will be described.

Before describing the uplink power control method according to the present invention, a zone switch procedure which may be performed by an IEEE 802.16m system will be described with reference to FIGS. 3 and 4.

Figure 3:
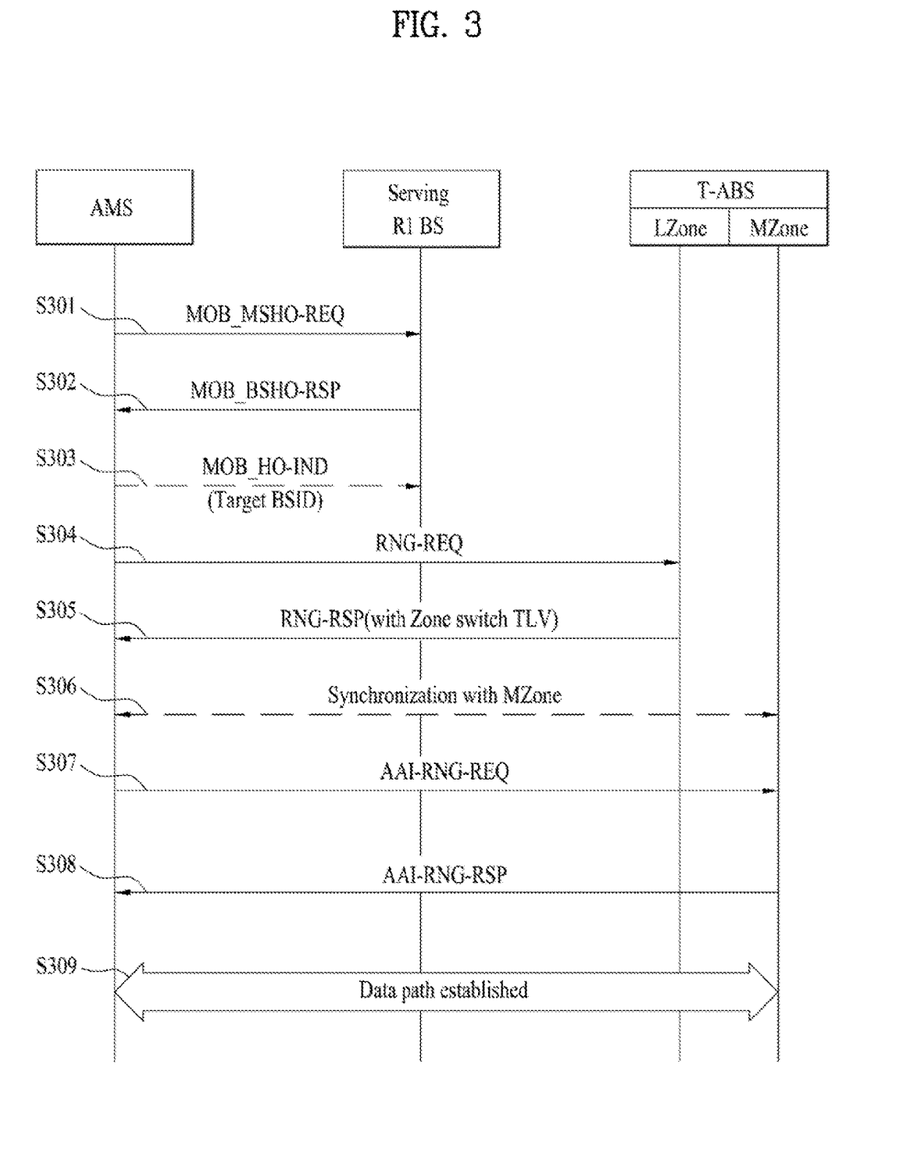
FIG. 3 is a flowchart showing an example of a zone switch procedure which may be performed by the mobile station according to the embodiment of the present invention.

FIG. 3 is a flowchart showing an example of a zone switch procedure which may be performed by the mobile station according to the embodiment of the present invention.

Referring to FIG. 3, the mobile station (AMS) may start to scan candidate base stations (candidate HO BSs) using a handover trigger (HO trigger) condition during communication with a legacy serving base station. When the handover condition is satisfied, for example, when a predetermined hysteresis margin value is exceeded, the mobile station may transmit a handover request (MOB_MSHO-REQ) message to the serving base station to request the serving base station to perform a handover procedure (S301).

The serving base station may transmit information related to handover acquired from the candidate base stations to the mobile station through a handover response (MOB_BSHO-RSP) message. The MOB_BSHO-RSP message may contain information for handover execution, such as action time for handover, a handover identifier (HO-ID), and a dedicated handover CDMA ranging code (Dedicated HO CDMA ranging code) (S302).

The mobile station may determine a legacy supporting ABS of the candidate base stations as a target base station based on the information contained in the MOB_BSHO-RSP message received from the serving base station. As a result, the mobile station may transmit a handover indication message to the serving base station (S303).

Subsequently, the mobile station transmits a ranging request (RNG-REQ) message to an LZone of the target base station (S304).

At this time, the ranging request message may contain Medium Access Control version (MAC version) information of the mobile station and a value of the MAC version information may be set to a value corresponding to an AMS. In addition, the ranging request message may contain a Zone Switch Capability field indicating a form of zone switch which may be performed by the mobile station.

The base station may recognize through MAC version information and the Zone Switch Capability field contained in the ranging request message or information acquired from the previous legacy serving base station that the mobile station having transmitted the ranging message is an advanced mobile station (AMS) and perform zone switch to an MZone.

To this end, the target base station transmits a ranging response (RNG-RSP) message containing information (Zone switch TLV, hereinafter referred to as "ZS TLV") requested to the mobile station for zone switch to the mobile station (S305).

At this time, the ZS TLV may contain information indicated in Table 3 below.

Table 3 indicates an example of ZS TLV information contained in the RNG-RSP message according to the present invention.

TABLE 3

| Name | Type (1 byte) | Length | Value |
|---|---|---|---|
| MZone advanced preamble index | 41 | 2 | |
| Time offset | 42 | 1 | Time offset between LZone and MZone |
| Zone switch mode | 44 | 1 | 0x01: Advanced mobile station maintains data communication with LZone of corresponding base station during network reentry into Mzone. 0x00: Advanced mobile station releases data communication with LZone before network reentry into Mzone. |
| Temporary station identifier | 46 | 1 | Temporary station identifier to be used in Mzone |
| Ranging initiation deadline | 47 | 1 | Effective time of temporary station identifier. Ranging initiation deadline is contained if temporary station identifier is contained. |

Referring to Table 3, the ZS TLV may contain preamble index (MZone A-Preamble index) information used in the Mzone, Time offset information indicating an interface (or ratio) between the LZone and the Mzone in a TDD frame structure, Zone Switch Mode information indicating whether the mobile station remains connected to the LZone during a zone switch process, temporary station identifier (Temporary STID) information to temporarily identify the mobile station in the MZone, and Ranging initiation deadline information indicating effective time of the temporary station identifier. In addition, although not indicated in Table 1, a nonce_base station (NONCE_ABS) value to generate a pairwise master key (PMK) may be contained.

Subsequently, the mobile station perform synchronization with the MZone of the target ABS using the information contained in the ZS TLV (S306) and requests an uplink resource to transmit a ranging request (AAI_RNG-REQ) message for zone switch execution (BR request for AAI_RNG-REQ) (not shown).

When the requested uplink resource is allocated from the MZone, the mobile station transmits a ranging request (AAI_RNG-REQ) message to the MZone (S307). At this time, a value of a Ranging Purpose Indication field of the ranging request message is set to a value (for example, 0b1010) indicating zone switch from the LZone to the MZone.

The target ABS transmits a ranging response (AAI_RNG-RSP) message to the mobile station as a response to the ranging request message transmitted by the mobile station (S308).

Subsequently, the mobile station may complete zone switch to the MZone and perform normal communication with the target ABS through the MZone (S309).

In the method described above with reference to FIG. 3, zone switch to the MZone is performed in a state in which the mobile station does not complete network reentry into the LZone of the target base station. Alternatively, zone switch to the MZone may be performed after the mobile station completes network reentry into the LZone, which will hereinafter be described with reference to FIG. 4.

Figure 4:
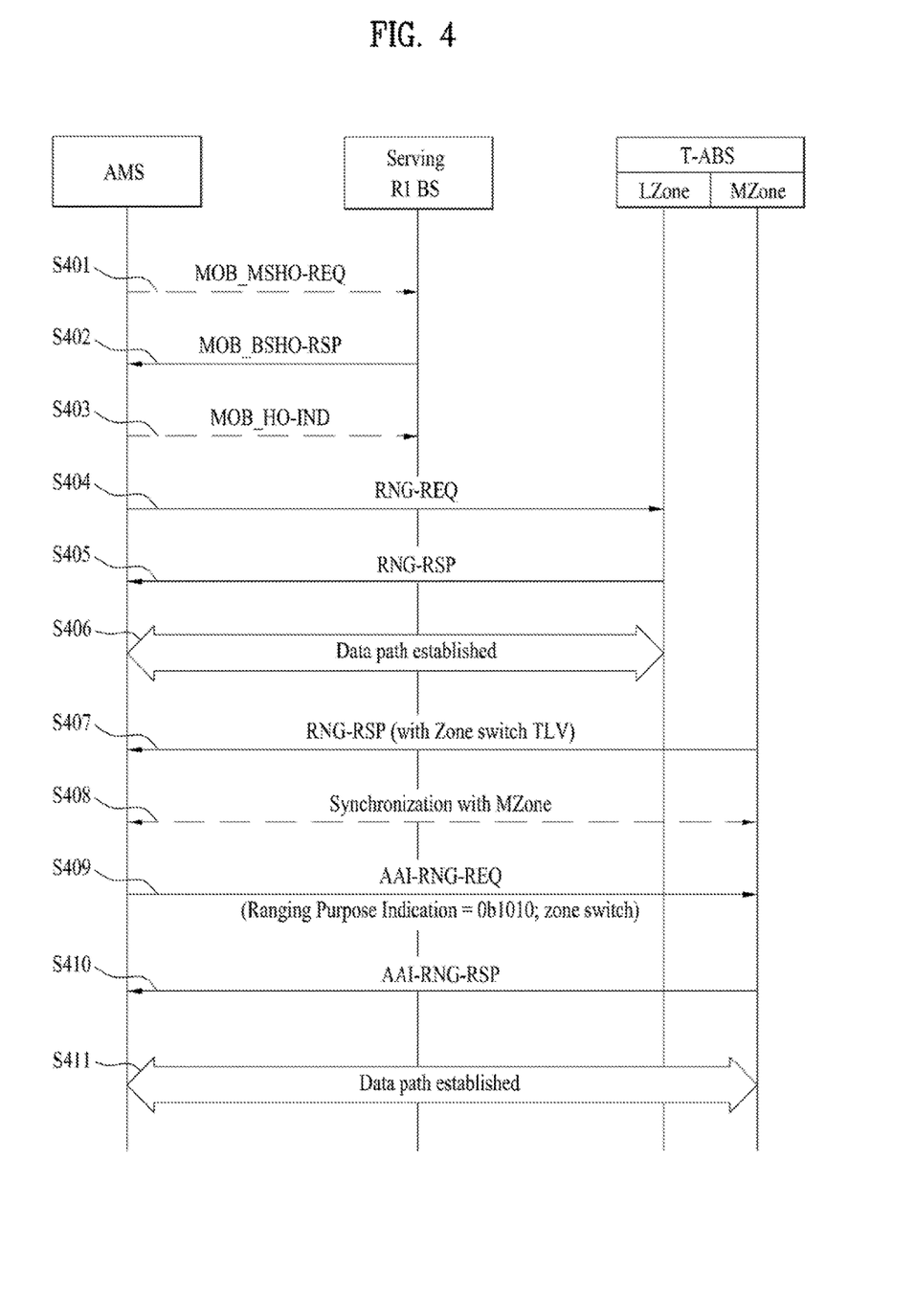
FIG. 4 is a flowchart showing another example of the zone switch procedure which may be performed by the mobile station according to the embodiment of the present invention.

FIG. 4 is a flowchart showing another example of the zone switch procedure which may be performed by the mobile station according to the embodiment of the present invention.

Step S401 to step S404 of FIG. 4 are similar to Step S301 to step S304 of FIG. 3. Therefore, a duplicated description will be omitted for simplification of the specification.

The target base station, having received an RNG-REQ message from the mobile station, may recognize through MAC version information contained in the ranging request message or information acquired from the previous serving legacy base station that the mobile station having transmitted the ranging message is an advance mobile station (AMS) and enable the AMS to perform zone switch to the MZone. However, the target base station may reserve zone switch performed by the mobile station due to load balancing between the LZone and the MZone.

As a result, the target base station may transmit a ranging response (RNG-RSP) message not containing ZS TLV to the mobile station (S405) and the mobile station may perform normal communication after completing network entry into the LZone of the target base station (S406).

Subsequently, in a case in which the target base station determines to instruct a corresponding mobile station to perform zone switch to the MZone, the target base station may transmit a ranging response (RNG-RSP) message containing ZS TLV to an unsolicited mobile station (S407).

As a result, the mobile station performs synchronization with the MZone of the target ABS using information contained in the ZS TLV (S408) and requests an uplink resource to transmit a ranging request (AAI_RNG-REQ) message for zone switch execution (BR request for AAI_RNG-REQ) (not shown).

When the requested uplink resource is allocated from the MZone, the mobile station transmits a ranging request (AAI_RNG-REQ) message to the MZone (S409). At this time, a value of a Ranging Purpose Indication field of the ranging request message is set to a value (for example, 0b1010) indicating zone switch from the LZone to the MZone.

The target ABS transmits a ranging response (AAI_RNG-RSP) message to the mobile station as a response to the ranging request message transmitted by the mobile station (S410).

Subsequently, the mobile station may complete zone switch to the MZone and perform normal communication with the target ABS through the MZone (S411).

In the above procedures described above with reference to FIGS. 3 and 4, zone switch is performed as an example of the handover process. Consequently, substantial zone switch procedure may correspond to step S305 to step S309 of FIG. 3 and step S407 to step S411 of FIG. 4.

In another aspect of the embodiment of the present invention, there is proposed a method of a mobile station controlling uplink transmit power for ranging execution to an MZone during zone switch in a handover procedure including acquiring transmit power parameters to be applied to an uplink signal to be transmitted from an LZone to the MZone and applying the acquired transmit power parameters to transmit power control. That is, there is proposed a method of a base station operating in a mixed mode previously informing a mobile station of uplink power control parameters to be applied to the MZone through the LZone.

The uplink power control parameters to be applied to the uplink signal to be transmitted to the MZone may be iotFP and offsetControl. The power control parameters, such as iotFP and offsetControl, may be contained in a ranging response (RNG-RSP) message to be transmitted through the LZone during zone switch in a ZS-TLV form. In particular, the power control parameters are useful in a case in which the ZS-TLV contains a temporary station identifier (TSTID) for the MZone to temporarily identify the mobile station. More specifically, in a case in which the ZS-TLV contains the TSTID and the power control parameters, when a CDMA ranging is omitted and an uplink resource to transmit an advance ranging request message is directly requested to the MZone (BR: Bandwidth Request), the parameters may be applied to uplink power control applied to the BR. The BR may be performed through transmission of bandwidth request header (BR Header) or bandwidth request message (BR message) or in a piggy back mode.

Meanwhile, in the above-described method, it is assumed that the BR is directly performed without CDMA ranging to the MZone and, when a resource according thereto is allocated, a ranging request message is transmitted. In a case in which the ZS-TLV contains a dedicated CDMA ranging code, the mobile station may apply the power control parameters contained in the ZS-TLV to code transmission while transmitting the dedicated ranging code to the MZone. Upon successful completion of the ranging code transmission, the mobile station transmits the AAI-RNG-REQ message to the MZone. In a case in which the TSTID is contained in the ZS-TLV, the AAI-RNG-REQ message is transmitted in a state in which the TSTID is contained in the AAI-RNG-REQ message.

In the above description, the power control is performed through the two procedures based on whether or not the CDMA ranging is performed. In both the two procedures, the values of the other uplink power control parameters, except the iotFP and the offsetControl contained in the ZS-TLV, applied to the LZone may also be applied to the MZone. A zone switch method based on the above two procedures will hereinafter be described in more detail with reference to FIG. 5.

Figure 5:
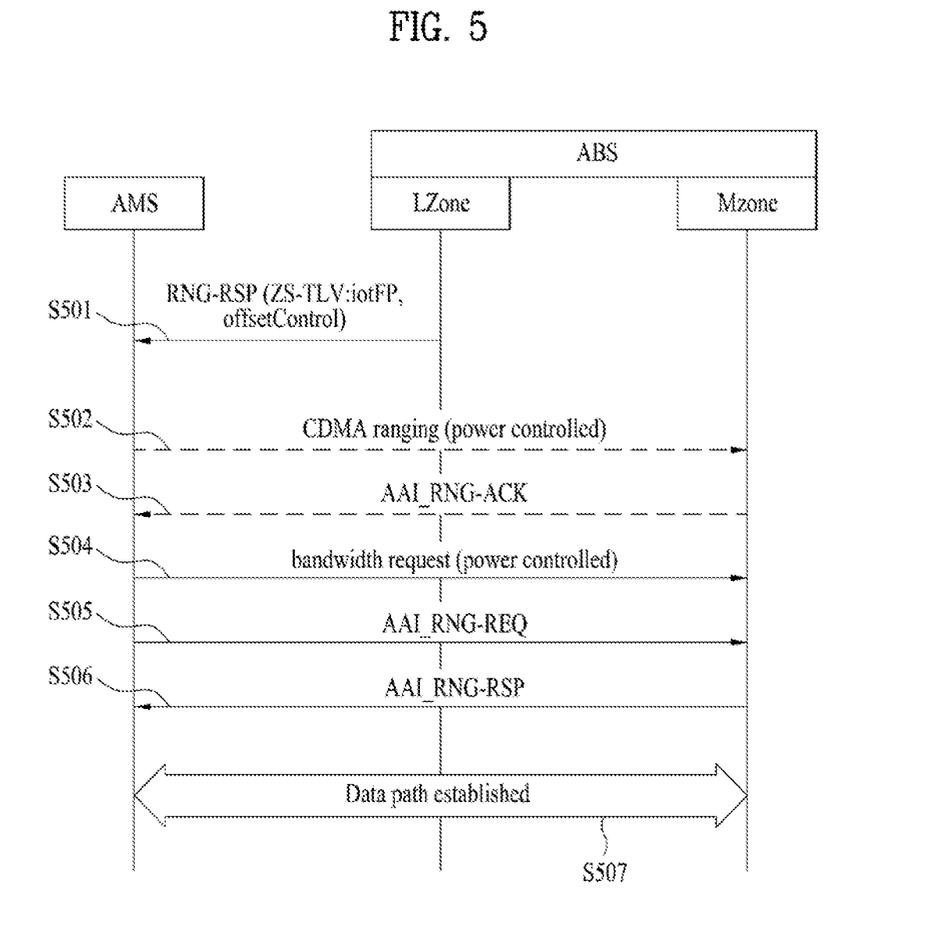
FIG. 5 is a flowchart showing an example of controlling transmit power to perform ranging when the mobile station according to the embodiment of the present invention performs zone switch.

FIG. 5 is a flowchart showing an example of controlling transmit power to perform ranging when the mobile station according to the embodiment of the present invention performs zone switch.

It is assumed that steps of FIG. 5 are performed after step S304 of FIG. 4 or step S406 of FIG. 4.

First, the mobile station may acquire ZS-TLV information containing uplink power control parameters, such as iotFP and offsetControl, through a ranging response message from an LZone of a base station operating in a mixed mode (S501).

In a case in which a dedicated CDMA ranging code is contained in the ZS-TLV information, the ZS-TLV information is transmitted to an MZone in a state in which the acquired power control parameters are applied to the corresponding ranging code (S502). The base station a ranging acknowledge (AAI-RNG-ACK) message to the mobile terminal through the MZone as a response to the ranging code (S503).

In a case in which the ZS-TLV information does not contain the dedicated ranging code but contains the power control parameters and a TSTID, the mobile station directly perform bandwidth request to the MZone using the TSTID without a CDMA ranging procedure (S504). At this time, the uplink power control parameters contained in the ZS-TLV are applied to the bandwidth request (BR).

Subsequently, when a resource according to the BR is allocated from the base station, the mobile station transmits a ranging request (AAI_RNG-REQ) message to the MZone through the corresponding resource (S505) and receives a ranging response (AAI_RNG-RSP) message as a response thereto (S506).

When the ranging procedure is successfully completed and a network reentry procedure is completed, the mobile station may complete network reentry into the MZone and perform normal data exchange (S507).

In the above description, the uplink power control is performed during the handover and zone switch processes according to the present invention. When the network reentry through the handover or the zone switch is completed, a System Configuration Descriptor (AAI-SCD) message, an uplink power control noise/interference (AAI-ULPC-NI) message, and an uplink power adjustment (AAI-UL-POWER-ADJ) message may be received to update the uplink power control parameters.

Configurations of Mobile Station and Base Station

Hereinafter, a mobile station (FBS) and a base station (MBS) to perform the embodiments of the present invention as described above will be described as another embodiment of the present invention.

The mobile station may operate as a transmitter on uplink and operate as a receiver on downlink. On the other hand, the base station may operate as a receiver on uplink and operate as a transmitter on downlink. That is, the mobile station and the base station may include a transmitter and a receiver for information or data transmission.

The transmitter and the receiver may include a processor, a module, parts and/or means to perform the embodiments of the present invention. Particularly, the transmitter and the receiver may include a module (means) to encode message, a module to decode encoded messages, and an antenna to transmit and receive messages. An example of a transmit end and a receive end will hereinafter be described with reference to FIG. 6.

Figure 6:
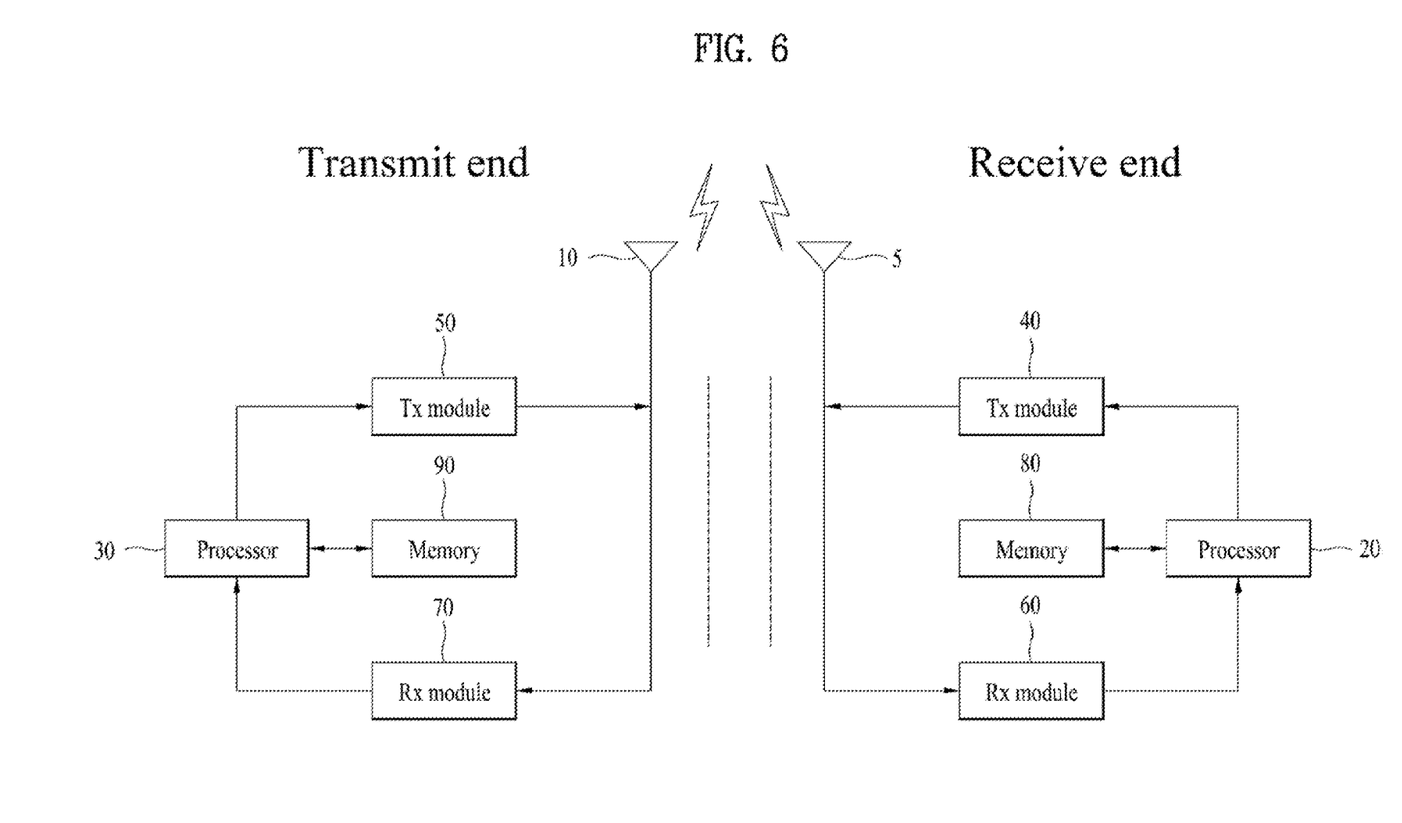
FIG. 6 is a block diagram showing an example of configurations of a transmit end and a receive end according to another embodiment of the present invention.

FIG. 6 is a block diagram showing an example of configurations of a transmit end and a receive end according to another embodiment of the present invention.

Referring to FIG. 6, the left side of FIG. 6 shows a configuration of the transmit end and the right side of FIG. 6 shows a configuration of the receive end. The transmit end and the receive end may respectively include antennas 5 and 10, processors 20 and 30, transmission modules (Tx modules) 40 and 50, receiving modules (Rx modules) 60 and 70, and memories 80 and 90. The respective components may perform functions corresponding to each other. The respective components will hereinafter be described in more detail.

The antennas 5 and 10 transmit signals generated from the transmission modules 40 and 50 to an external device or receive external wireless signals and transmit the external wireless signals to the receiving module 60 and 70. In a case in which a Multi-Input Multi-Output (MIMO) function is supported, the transmit end and the receive end may include two or more antennas.

An antenna, a transmission module, and a receiving module may constitute an radio frequency (RF) module.

The processors 20 and 30 generally control overall operation of the mobile station. For example, it is possible to perform a controller function, a function of variably controlling a medium access control (MAC) frame depending on service characteristic and transmission environment, a handover function, and an authentication and encryption function, etc., which are necessary to perform the above-mentioned embodiments of the present invention. More specifically, the processors 20 and 30 may perform overall control operation to perform the handover process or the zone switch shown in FIGS. 2 to 5

Particularly, when performing the handover, the processor of the mobile station (AMS) may receive iotFP and offsetControl information through the handover command (AAI-HO-CMD) message received from the serving base station and apply the received information to transmit power of the dedicated ranging code transmitted to the target base station.

On the other hand, when performing the zone switch, the processor of the mobile station may the iotFP and offsetControl information acquired through the ZS-TLV contained in the RNG-RSP message to transmit power control in transmitting the ranging code to the target zone or requesting the bandwidth to transmit the ranging request message.

In addition, the processor of the mobile station may perform the overall control operations disclosed in the above-mentioned embodiments.

The transmission modules 40 and 50 may perform predetermined coding and modulation with respect to data scheduled by the processors 20 and 30 and transmitted to an external device and then transmit the coded and modulated data to the antenna 10.

The receiving modules 60 and 70 may perform decoding and demodulation with respect to external wireless signals received through the antennas 5 and 10 to restore the signals into the original data form and transmit the restored signals to the processors 20 and 30.

The memories 80 and 90 may store programs to execute processing and control of the processors 20 and 30 or temporarily store input/output data. In addition, the memories 80 and 80 may include at least one storage medium selected from among a flash memory type memory, a hard disc type memory, a multimedia card micro type memory, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

Meanwhile, the base station may perform a controller function to perform the embodiments of the present invention as described above, an Orthogonal Frequency Division Multiple Access (OFDMA) packet scheduling function, a Time Division Duplex (TDD) packet scheduling and channel multiplexing function, a function of variably controlling a MAC frame depending on service characteristic and transmission environment, a high-speed traffic real-time control function, a handover function, an authentication and encryption function, a packet modulation and demodulation function for data transmission, a high-speed packet channel coding function, and a real-time modem control function through at least one of the above-mentioned modules or further include additional means, modules, or parts to execute these functions.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. In addition, claims that are not explicitly cited in each other in the appended claims may be presented in combination as an embodiment of the present invention or included as a new claim by a subsequent amendment after the application is filed.

INDUSTRIAL APPLICABILITY

As is apparent from the above description, a power control method for more efficient zone switch in a broadband wireless access system and the configuration of a mobile station to perform the power control method is applied to an IEEE802.16m system. However, the power control and the configuration of the mobile station to perform the power control method may be applied to various mobile communication systems, such as 3GPP and 3GPP2 systems, in addition to the IEEE802.16m system.

The invention claimed is:

1. A method of performing synchronizing with a base station supporting a first zone and a second zone, by a mobile station, in a wireless access system, the method comprising:
receiving, by the mobile station from the base station through the first zone of the base station, information for synchronizing with a second zone of the base station, the information for synchronizing including information related to a time offset between the first zone and the second zone; and
synchronizing, by the mobile station, with the second zone of the base station based on the information,
wherein the first zone comprises a first resource for communication with both a first type mobile station and a second type mobile station,
wherein the second zone comprises a second resource for communication with only the second type mobile station,
wherein the first type mobile station is capable of supporting communication with only the first zone, and the second type mobile station is capable of supporting communication with a plurality of zones including the first zone and the second zone, and
wherein the mobile station corresponds to the second type mobile station.

2. The method of claim 1, wherein the first resource comprises a first time-frequency resource, and wherein the second resource comprises a second time-frequency resource.

3. The method of claim 1, wherein the information for synchronizing further include an identifier of the mobile station.

4. The method of 1, further comprising:
transmitting, by the mobile station to the base station through the second zone of the base station, a request for an uplink resource for the second zone.

5. A method of performing synchronizing with a mobile station, by a base station supporting a first zone and a second zone, in a wireless access system, the method comprising:
transmitting, by the base station to the mobile station through the first zone of the base station, information for synchronizing a second zone of the base station with a mobile station, the information for synchronizing including information related to a time offset between the first zone and the second zone;
synchronizing, by the base station, the second zone of the base station with the mobile station based on the information for synchronizing,
wherein the first zone comprises a first resource for communication with both a first type mobile station and a second type mobile station,
wherein the second zone comprises a second resource for communication with only the second type mobile station,
wherein the first type mobile station is capable of supporting communication with only the first zone, and the second type mobile station is capable of supporting communication with a plurality of zones including the first zone and the second zone, and
wherein the mobile station corresponds to the second type mobile station.

6. The method of claim 5, wherein the first resource comprises a first time-frequency resource, and wherein the second resource comprises a second time-frequency resource.

7. The method of claim 5, wherein the information for synchronizing further includes an identifier of the mobile station.

8. The method of claim 5, further comprising:
receiving, by the base station from the mobile station through the second zone of the base station, a request for an uplink resource for the second zone.

9. A mobile station of performing synchronizing with a base station supporting a first zone and a second zone in a wireless access system, the mobile station comprising:
a receiver; and
a processor operatively connected to the receiver,
wherein the processor configured to control the receiver to:
receive from the base station through the first zone of the base station, information for synchronizing with a second zone of the base station, the information for synchronizing including information related to a time offset between the first zone and the second zone;
synchronize with the second zone of the base station based on the information for synchronizing while performing data communication with the base station in the first zone of the base station, wherein the first zone comprises a first resource for communication with both a first type mobile station and a second type mobile station, wherein the second zone comprises a second resource for communication with only the second type mobile station, wherein the first type mobile station is capable of supporting communication with only the first zone, and the second type mobile station is capable of supporting communication with a plurality of zones including the first zone and the second zone, and wherein the mobile station corresponds to the second type mobile station.

10. The mobile station of claim 9, wherein the first resource comprises a first time-frequency resource, and wherein the second resource comprises a second time-frequency resource.

11. The mobile station of claim 9, wherein the information for synchronizing further include an identifier of the mobile station.

12. The mobile station of claim 9, further comprising:
a transmitter operatively connected to the processor,
wherein the processor is configured to control the transmitter to transmit, to the base station through the second zone of the base station, a request for an uplink resource for the second zone.

13. A base station of performing synchronizing with a mobile station, the base station supporting a first zone and a second zone, in a wireless access system, the base station comprising:
a transmitter; and
a processor operatively connected to the transmitter,
wherein the processor configured to control the transmitter to:
transmit, to the mobile station through the first zone of the base station, information for synchronizing a second zone of the base station with a mobile station, the information for synchronizing including information related to a time offset between the first zone and the second zone; and synchronize the second zone of the base station with mobile station based on the information for synchronizing, wherein the first zone is comprises a first resource for communication with both a first type mobile station and a second type mobile station, wherein the second zone comprises a second resource for communication with only the second type mobile station, wherein the first type mobile station is capable of supporting communication with only the first zone, and the second type mobile station is capable of supporting communication with a plurality of zones including the first zone and the second zone, and wherein the mobile station corresponds to the second type mobile station.

14. The base station of claim 13, wherein the first resource comprises a first time-frequency resource, and wherein the second resource comprises a second time-frequency resource.

15. The base station of claim 13, wherein the information for synchronizing further includes an identifier of the mobile station.

16. The base station of claim 13, further comprising:
a receiver operatively connected to the processor,
wherein the processor configured to control the receiver to receive, from the mobile station through the second zone of the base station, a request for an uplink resource for the second zone.

* * * * *